US008676626B1

(12) United States Patent
Vance

(10) Patent No.: US 8,676,626 B1
(45) Date of Patent: *Mar. 18, 2014

(54) EVENT NOTIFICATION AND ORGANIZATION UTILIZING A COMMUNICATION NETWORK

(75) Inventor: Michael Steffen Vance, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 557 days.

This patent is subject to a terminal disclaimer.

(21) Appl. No.: 12/413,459

(22) Filed: Mar. 27, 2009

(51) Int. Cl.
| | |
|---|---|
| G06Q 10/00 | (2012.01) |
| G06F 15/16 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl.
USPC ........ 705/7.16; 705/7.18; 705/7.19; 719/318; 709/204

(58) Field of Classification Search
USPC .......... 719/318; 715/751, 752, 753, 758, 759; 709/204; 705/7.18, 7.19
See application file for complete search history.

(56) References Cited

U.S. PATENT DOCUMENTS

| | | | |
|---|---|---|---|
| 4,723,209 | A | 2/1988 | Hernandez et al. |
| D296,218 | S | 6/1988 | Wells-Papanek et al. |
| D298,144 | S | 10/1988 | Wells-Papanek et al. |

(Continued)

FOREIGN PATENT DOCUMENTS

| | | |
|---|---|---|
| DE | 10155431 A1 | 6/2003 |
| EP | 1246434 A1 | 10/2002 |

(Continued)

OTHER PUBLICATIONS

Alltel Launches 'My Circle,' a One-of-a-Kind Program That Gives Customers Free Calls to Any Network or Number They Choose, Business Wire, Apr. 20, 2006, pp. 1, New York.

(Continued)

*Primary Examiner* — Emerson Puente
*Assistant Examiner* — Charles Swift
(74) *Attorney, Agent, or Firm* — Knobbe Martens Olson & Bear LLP

(57) ABSTRACT

A user of a telecommunications or other computing device may notify his or her contacts of an event of interest, which event may be modified by the user's contacts without requiring the permission of the originating user to do so. In this regard, an event organizing service receives an event notification request from a user of a telecommunications device (e.g., a mobile telephone), automatically identifies the user's contacts to whom the event notification is to be published, and publishes the event notification to the automatically identified contacts. A contact who receives the event notification may update the event, e.g., by modifying data describing the event, without the permission of the originating user. Accordingly, a contact who has received the event notification may modify the event (e.g., change the date/time, change the location, etc.) and the event organizing service may publish a notification for the updated event to the originating user and his or her contacts informing them of the modification. It will be appreciated that as updates to the event are made by the user's contacts (and in some cases the user herself), the event is ultimately organized by the user's social network or community without requiring the user to organize the details of or manage the event herself.

41 Claims, 11 Drawing Sheets

(56) References Cited

U.S. PATENT DOCUMENTS

| | | |
|---|---|---|
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| D397,687 S | 9/1998 | Arora et al. |
| D398,595 S | 9/1998 | Baer et al. |
| 5,867,226 A | 2/1999 | Wehmeyer et al. |
| 5,889,517 A | 3/1999 | Ueda et al. |
| 5,987,107 A | 11/1999 | Brown |
| 6,006,200 A | 12/1999 | Boies et al. |
| 6,016,478 A | 1/2000 | Zhang et al. |
| 6,023,275 A | 2/2000 | Horvitz et al. |
| D424,036 S | 5/2000 | Arora et al. |
| D424,541 S | 5/2000 | Mugura |
| 6,108,533 A | 8/2000 | Brohoff |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,236,398 B1 | 5/2001 | Kojima et al. |
| D445,426 S | 7/2001 | Wang et al. |
| D446,790 S | 8/2001 | Wang et al. |
| 6,313,877 B1 | 11/2001 | Anderson |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D470,857 S | 2/2003 | Anderson et al. |
| D471,226 S | 3/2003 | Gray |
| D472,902 S | 4/2003 | Nashida et al. |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,716,101 B1 | 4/2004 | Meadows et al. |
| 6,741,268 B1 | 5/2004 | Hayakawa |
| D495,339 S | 8/2004 | Gildred |
| 6,775,659 B2 | 8/2004 | Clifton-Bligh |
| D495,715 S | 9/2004 | Gildred |
| 6,788,987 B2 | 9/2004 | Slechta et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,920,328 B2 | 7/2005 | Wollrab |
| 6,925,650 B1 | 8/2005 | Arsenault et al. |
| 6,959,207 B2 | 10/2005 | Keinonen et al. |
| 6,978,473 B1 | 12/2005 | Nsonwu et al. |
| D523,439 S | 6/2006 | Kuroda |
| D523,440 S | 6/2006 | Hernandez et al. |
| D523,868 S | 6/2006 | Kuroda |
| 7,086,008 B2 | 8/2006 | Capps et al. |
| 7,089,287 B2 | 8/2006 | Bellotti et al. |
| 7,111,788 B2 | 9/2006 | Reponen |
| 7,117,445 B2 | 10/2006 | Berger |
| 7,137,073 B2 | 11/2006 | Kim et al. |
| 7,178,109 B2 | 2/2007 | Hewson et al. |
| 7,187,761 B2 | 3/2007 | Bookstaff |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,236,780 B2 | 6/2007 | Benco et al. |
| D545,827 S | 7/2007 | Evans et al. |
| D545,832 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,743 S | 8/2007 | Takahashi et al. |
| D550,681 S | 9/2007 | Totten et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D558,221 S | 12/2007 | Nagata et al. |
| 7,312,712 B1 * | 12/2007 | Worrall ..................... 340/573.4 |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D567,817 S | 4/2008 | Kwag et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D590,407 S | 4/2009 | Watanabe et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| D593,574 S | 6/2009 | Guimaraes et al. |
| D593,576 S | 6/2009 | Ball et al. |
| D594,015 S | 6/2009 | Singh et al. |
| 7,546,543 B2 | 6/2009 | Louch et al. |
| 7,555,727 B2 | 6/2009 | Hawkins et al. |
| D596,192 S | 7/2009 | Shotel |
| 7,577,700 B2 | 8/2009 | Tolson et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,812 S | 9/2009 | Hirsch |
| D599,813 S | 9/2009 | Hirsch |
| D599,814 S | 9/2009 | Ogura et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |

(56) References Cited

U.S. PATENT DOCUMENTS

| | | | |
|---|---|---|---|
| D604,317 S | 11/2009 | Hoefnagels et al. | |
| D604,740 S | 11/2009 | Matheny et al. | |
| 7,620,996 B2 | 11/2009 | Torres et al. | |
| D605,200 S | 12/2009 | Sakai | |
| D605,652 S | 12/2009 | Plaisted et al. | |
| D605,653 S | 12/2009 | Danton | |
| D606,088 S | 12/2009 | Yokouchi et al. | |
| D606,550 S | 12/2009 | La et al. | |
| 7,636,889 B2 | 12/2009 | Weber et al. | |
| D608,366 S | 1/2010 | Matas | |
| 7,646,745 B2 | 1/2010 | Caldwell et al. | |
| 7,650,361 B1 | 1/2010 | Wong et al. | |
| D609,714 S | 2/2010 | Oda et al. | |
| D609,715 S | 2/2010 | Chaudhri | |
| D610,159 S | 2/2010 | Matheny et al. | |
| D610,161 S | 2/2010 | Matas | |
| 7,665,028 B2 | 2/2010 | Cummins et al. | |
| D611,056 S | 3/2010 | Langlois et al. | |
| D611,484 S | 3/2010 | Mays et al. | |
| D611,485 S | 3/2010 | Marashi | |
| D611,490 S | 3/2010 | Lee et al. | |
| D612,394 S | 3/2010 | La et al. | |
| D612,860 S | 3/2010 | Tarara et al. | |
| 7,673,017 B2 | 3/2010 | Kim et al. | |
| 7,685,520 B2 | 3/2010 | Rashkovskiy et al. | |
| 7,685,530 B2 | 3/2010 | Sherrard et al. | |
| D613,300 S | 4/2010 | Chaudhri | |
| D614,191 S | 4/2010 | Takano et al. | |
| D614,192 S | 4/2010 | Takano et al. | |
| D614,646 S | 4/2010 | Chen et al. | |
| D615,090 S | 5/2010 | Sogabe | |
| D615,546 S | 5/2010 | Lundy et al. | |
| D615,549 S | 5/2010 | Caine et al. | |
| 7,720,498 B2 | 5/2010 | Lee | |
| D619,593 S | 7/2010 | Fujioka et al. | |
| 7,752,552 B2 | 7/2010 | Pennington et al. | |
| D620,948 S | 8/2010 | Scalisi et al. | |
| 7,853,881 B1* | 12/2010 | Aly Assal et al. | 715/734 |
| 7,886,000 B1 | 2/2011 | Polis et al. | |
| 2002/0045960 A1 | 4/2002 | Phillips et al. | |
| 2002/0052754 A1 | 5/2002 | Joyce et al. | |
| 2002/0068583 A1 | 6/2002 | Murray et al. | |
| 2002/0145623 A1 | 10/2002 | Decombe | |
| 2003/0126250 A1* | 7/2003 | Jhanji | 709/223 |
| 2003/0225879 A1 | 12/2003 | Chipchase | |
| 2004/0046796 A1 | 3/2004 | Fujita | |
| 2004/0058698 A1 | 3/2004 | Crockett et al. | |
| 2004/0067751 A1 | 4/2004 | Vandermeijden | |
| 2004/0077340 A1 | 4/2004 | Forsyth | |
| 2004/0091093 A1 | 5/2004 | Bookstaff | |
| 2004/0100479 A1 | 5/2004 | Nakano et al. | |
| 2004/0102225 A1 | 5/2004 | Furuta et al. | |
| 2004/0109436 A1* | 6/2004 | Vargas et al. | 370/350 |
| 2004/0122684 A1 | 6/2004 | Kaikuranta | |
| 2004/0162812 A1 | 8/2004 | Lane | |
| 2004/0162830 A1 | 8/2004 | Shirwadkar et al. | |
| 2004/0221239 A1 | 11/2004 | Hachigian et al. | |
| 2004/0235520 A1 | 11/2004 | Cadiz et al. | |
| 2004/0239982 A1 | 12/2004 | Gignac | |
| 2004/0250217 A1 | 12/2004 | Tojo et al. | |
| 2005/0005235 A1 | 1/2005 | Satterfield et al. | |
| 2005/0010876 A1 | 1/2005 | Robertson et al. | |
| 2005/0020243 A1 | 1/2005 | Benco et al. | |
| 2005/0039140 A1 | 2/2005 | Chen | |
| 2005/0041011 A1 | 2/2005 | Silfverberg et al. | |
| 2005/0071759 A1* | 3/2005 | Connors et al. | 715/517 |
| 2005/0071780 A1 | 3/2005 | Muller et al. | |
| 2005/0076053 A1* | 4/2005 | Katayama et al. | 707/102 |
| 2005/0079863 A1 | 4/2005 | Macaluso | |
| 2005/0091272 A1 | 4/2005 | Smith et al. | |
| 2005/0094205 A1 | 5/2005 | Lo et al. | |
| 2005/0114374 A1 | 5/2005 | Juszkiewicz et al. | |
| 2005/0118996 A1 | 6/2005 | Lee et al. | |
| 2005/0143097 A1* | 6/2005 | Wilson et al. | 455/456.3 |
| 2005/0143135 A1 | 6/2005 | Brems et al. | |
| 2005/0143138 A1 | 6/2005 | Lee et al. | |
| 2005/0172001 A1* | 8/2005 | Zaner et al. | 709/205 |
| 2005/0209994 A1 | 9/2005 | Noro et al. | |
| 2005/0229110 A1 | 10/2005 | Gegner et al. | |
| 2005/0235225 A1 | 10/2005 | Pradhan et al. | |
| 2005/0235226 A1 | 10/2005 | Watanabe et al. | |
| 2005/0235251 A1 | 10/2005 | Arend et al. | |
| 2005/0243979 A1 | 11/2005 | Starbuck et al. | |
| 2005/0245236 A1 | 11/2005 | Servi et al. | |
| 2005/0246654 A1 | 11/2005 | Hally et al. | |
| 2005/0278652 A1 | 12/2005 | Scholz | |
| 2006/0055700 A1 | 3/2006 | Niles et al. | |
| 2006/0084410 A1 | 4/2006 | Sutaria et al. | |
| 2006/0095437 A1* | 5/2006 | Bazot et al. | 707/10 |
| 2006/0095976 A1* | 5/2006 | Torres et al. | 726/28 |
| 2006/0123360 A1 | 6/2006 | Anwar et al. | |
| 2006/0143574 A1 | 6/2006 | Ito et al. | |
| 2006/0212829 A1 | 9/2006 | Yahiro et al. | |
| 2006/0216021 A1 | 9/2006 | Touchard et al. | |
| 2006/0224430 A1* | 10/2006 | Butt | 705/8 |
| 2006/0242597 A1 | 10/2006 | Park | |
| 2006/0293057 A1 | 12/2006 | Mazerski et al. | |
| 2007/0011617 A1 | 1/2007 | Akagawa et al. | |
| 2007/0033540 A1 | 2/2007 | Bridges et al. | |
| 2007/0038503 A1 | 2/2007 | Krajcev et al. | |
| 2007/0067738 A1 | 3/2007 | Flynt et al. | |
| 2007/0073874 A1 | 3/2007 | Moghaddam et al. | |
| 2007/0117572 A1 | 5/2007 | Adam et al. | |
| 2007/0130221 A1 | 6/2007 | Abdo et al. | |
| 2007/0143399 A1* | 6/2007 | Qi | 709/204 |
| 2007/0162862 A1 | 7/2007 | Ogasawara et al. | |
| 2007/0174389 A1* | 7/2007 | Armstrong et al. | 709/204 |
| 2007/0198947 A1 | 8/2007 | Cox et al. | |
| 2007/0218891 A1 | 9/2007 | Cox | |
| 2007/0226645 A1 | 9/2007 | Kongqiao et al. | |
| 2007/0233736 A1 | 10/2007 | Xiong et al. | |
| 2007/0255786 A1* | 11/2007 | Mock et al. | 709/204 |
| 2007/0255807 A1 | 11/2007 | Hayashi et al. | |
| 2007/0268908 A1 | 11/2007 | Linkola et al. | |
| 2008/0059570 A1 | 3/2008 | Bill | |
| 2008/0082398 A1* | 4/2008 | Canipe et al. | 705/10 |
| 2008/0086703 A1 | 4/2008 | Flynt et al. | |
| 2008/0122870 A1 | 5/2008 | Brodersen et al. | |
| 2008/0235248 A1 | 9/2008 | Krantz et al. | |
| 2008/0275767 A1* | 11/2008 | Rafie | 705/12 |
| 2008/0307661 A1 | 12/2008 | Hembree | |
| 2008/0319943 A1 | 12/2008 | Fischer | |
| 2009/0040875 A1 | 2/2009 | Buzescu et al. | |
| 2009/0094088 A1* | 4/2009 | Chen et al. | 705/9 |
| 2009/0094532 A1 | 4/2009 | Lyle et al. | 715/753 |
| 2009/0106376 A1 | 4/2009 | Tom et al. | |
| 2009/0164923 A1 | 6/2009 | Ovi | |
| 2009/0276318 A1* | 11/2009 | Broadbent et al. | 705/14.64 |
| 2009/0327437 A1 | 12/2009 | Estrada | |
| 2010/0057858 A1 | 3/2010 | Shen et al. | |
| 2010/0076804 A1 | 3/2010 | Jones et al. | |
| 2010/0169145 A1* | 7/2010 | O'Sullivan et al. | 705/9 |
| 2010/0246789 A1 | 9/2010 | Vance et al. | |
| 2010/0250672 A1 | 9/2010 | Vance et al. | |
| 2010/0262926 A1 | 10/2010 | Gupta et al. | |
| 2010/0293105 A1 | 11/2010 | Blinn et al. | |
| 2011/0047182 A1 | 2/2011 | Shepherd | |

FOREIGN PATENT DOCUMENTS

| | | |
|---|---|---|
| EP | 1571808 A1 | 9/2005 |
| JP | H11-088496 | 3/1999 |
| JP | H11-327741 | 11/1999 |
| JP | 2000-348058 A | 12/2000 |
| JP | 2003-198705 A | 7/2003 |
| JP | 2004-208217 A | 7/2004 |
| JP | 2004-348601 A | 12/2004 |
| JP | 2005-072958 A | 3/2005 |
| JP | 2006-107473 | 4/2006 |
| JP | 2007-524892 | 8/2007 |
| KR | 10-2006-0031624 | 4/2006 |
| WO | WO 00/25501 A1 | 5/2000 |
| WO | WO 2005/045799 A1 | 5/2005 |

(56) References Cited

FOREIGN PATENT DOCUMENTS

| WO | WO 2005/064441 A1 | 7/2005 |
| WO | WO 2006/016227 A2 | 2/2006 |
| WO | WO 2007/127642 | 11/2007 |

OTHER PUBLICATIONS

Alltel's 'My Circle' Plan Lets Subscribers Adds 10 Numbers For Unlimited Calls, Wireless News, Apr. 23, 2006, pp. 2, Coventry.

AT&T, LG Xenon User Guide, Mar. 8, 2009, 146 pages.

Boy Genius, LG Xenon hitting AT&T Before Christmas?, http://www.boygeniusreport.com/2008/09/24/lg-xenon-hitting-att-before-christmas/, Sep. 24, 2008, 1 page.

Cuneo, Alice Z., Alltel Gets Aggressive in Telecom War, Advertising Age, Apr. 24, 2006, vol. 77, Issue 17, pp. 8, 1 p., Chicago (Midwest region edition).

Weisser, Cybele and Farnoosh Torabi. "What do you pay to stay connected?" Money Magazine, Nov. 24, 2003. http://money.cnn.com/2003/11/20/pf/portability_strategy_0312/index.htm.

* cited by examiner

EVENT NOTIFICATION AND ORGANIZATION UTILIZING A COMMUNICATION NETWORK

BACKGROUND

Generally described, telecommunications devices and communication networks facilitate the collection and exchange of information. Utilizing a communication network and relevant communication protocols, a telecommunications device can engage in audio and/or data communications with telecommunications devices, such as voice calls, video calls, text messages (e.g., SMS), multimedia messages (e.g., MMS), content streaming, instant messaging, Web surfing, and the like.

To facilitate communications, telecommunications devices can be associated with software and hardware components that allow the telecommunications device to maintain contact information, such as telephone numbers, email addresses, messaging addresses, etc., maintain personal information, such as task lists, calendars, etc. and send messages utilizing the contact information via available communication channels.

Given the prevalence of telecommunications devices in an increasingly mobile society, many users utilize their telecommunications devices to organize events and notify their contacts of these events and their locations. However, such events are typically organized and managed directly by a user who has been granted "organizer rights" and who thus controls the salient details of the event, e.g., location, date/time, etc. Accordingly, changes to the event can only be made with permission of the organizer (or his or her delegate(s)). This places an administrative burden on a user, who, for example, may be interested in a certain event, but not interested in fully organizing the event. Moreover, such rigid event organization does not lend itself to social network environments in which users are accustomed to communicating and interacting on a group or community basis.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Generally described, aspects of the present disclosure relate to notifying a user's contacts of an event of interest and enabling the user's contacts to update the event without requiring the permission of the originating user to do so. In this regard, an event organizing service is described in one embodiment that receives an event notification request from a user of a telecommunications device (e.g., a mobile telephone), automatically identifies the user's contacts to whom the event notification is to be published, and publishes the event notification to the automatically identified contacts. In accordance with yet other aspects of the present disclosure, a contact who receives the event notification may update the event, e.g., by modifying data describing the event, without the permission of the originating user. In this regard, the originating user and contacts to whom the event notification is published are not granted "organizer rights," as are granted in typical calendar or event planning applications where data describing a scheduled event (e.g., date/time, location, etc.) can only be changed by the user who scheduled the event (e.g., the organizer) or one of the organizer's delegates. Accordingly, in one embodiment, a contact who has received the event notification may modify the event (e.g., change the date/time, change the location, etc.) and the event organizing service may publish a notification for the updated event to the originating user and his or her contacts informing them of the modification. It will be appreciated that as updates to the event are made by the user's contacts (and in some cases the user herself), the event is ultimately organized by the user's social network or community without requiring the user to organize the details of or manage the event herself.

Although aspects of the present disclosure will be described with regard to an illustrative telecommunications environment and component interactions, telecommunications protocols, flow diagrams and user interfaces, one skilled in the relevant art will appreciate that the disclosed embodiments are illustrative in nature and should not be construed as limiting. Specifically, although the term telecommunications device is used in this document, the term represents any type of device having a component for communicating with one or more other devices via one or more communication paths. Such communication paths can include wireless communication paths (via infra-red, RF, optical, terrestrial, or satellite communication media) and wired communication paths.

Figure 1:
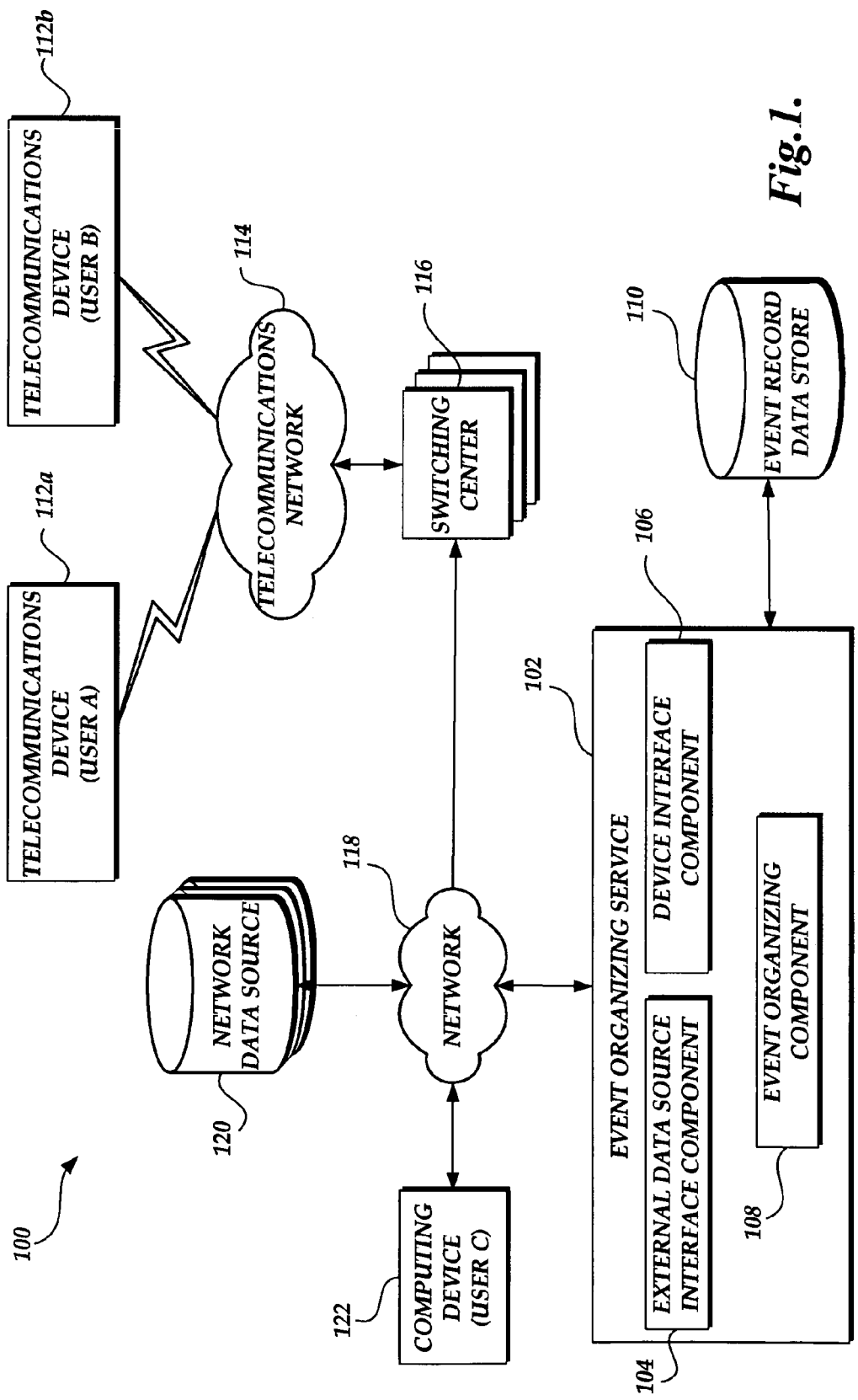
FIG. 1 is a block diagram illustrative of a telecommunications environment in which a user of a telecommunications device may notify his or her contacts of an event of interest to the user, which event may be modified by the user's contacts without the user's permission.

With reference now to FIG. 1, a block diagram illustrative of a telecommunications environment 100 in which a user of a telecommunications device may notify his or her contacts of an event of interest to the user (which event may be modified by the user's contacts without the user's permission) will be described. A contact may correspond to an individual person, an identifier associated with a person such as a telephone number, a group of people, an identifier associated with a group of people, and the like. The telecommunications environment 100 can include an event organizing service 102. As described above, the event organizing service 102 may receive an event notification request from a user utilizing a telecommunications or other computing device, automatically identify the user's contacts to whom the event notification is to be published, and publish the event notification to the automatically identified contacts. In one embodiment, event records including data describing each event (e.g., an event descriptor, date/time, location, message, etc.) for which a notification is to be or has been published are stored in an event record data store 110 accessible by the event organizing service 102. An event record may include any data describing the event obtained from the originating user or her contacts, as well as any location or other supplemental data obtained by the event organizing service 102 from other sources, such as network data sources 120. Such network data sources may include web sites, location based services, social network services, telecommunications services, message publication services, etc. While the event record data store 110 is depicted in FIG. 1 as being local to the event organizing service 102, those skilled in the art will appreciate that the event record data store 110 may be remote to the event organizing service 102 and/or may be a network based service itself.

While the event organizing service 102 is depicted in FIG. 1 as implemented by a single computing device in the telecommunications environment 100, this is illustrative only. The event organizing service 102 may be embodied in a plurality of computing devices, each executing an instance of the event organizing service. A server or other computing device implementing the event organizing service 102 may include memory, processing unit(s), and computer readable medium drive(s), all of which may communicate with one another by way of a communication bus. The network interface may provide connectivity over the network 118 and/or other networks or computer systems. The processing unit(s) may communicate to and from memory containing program instructions that the processing unit(s) executes in order to operate the event organizing service 102. The memory generally includes RAM, ROM, and/or other persistent and auxiliary memory.

As illustrated in FIG. 1, the event organizing service 102 can include an external data source interface component 104 for obtaining external information from network data sources 120, such as location data for the event, the originating user, or the user's identified contacts and other supplemental data for the event (e.g., an image of the event location; a map to the event location; reviews for the event or event location; recommendations for related events, services, products, activities, and other locations; etc.). The event organizing service 102 can also include a device interface component 106 for obtaining device information from the telecommunications or other computing devices associated with the user or the user's identified contacts (e.g., location data for the user's telecommunications device, an IP address for a contact's home computing device, etc.). The event organizing service 102 can further include an event organizing component 108 for processing the obtained data, as well as the requests for event notification and event updates so as to facilitate organization of an event by the user and his or her contacts without granting organizer rights.

One skilled in the relevant art will appreciate that the event organizing service 102 may correspond to a number of computer devices, such as server computing devices. Additionally, the external data source interface component 104, device interface component 106, and event organizing component 108 may be implemented in a single computing device or across multiple computing devices. One skilled in the relevant art will also appreciate that the event organizing service 102 may include any one of a number of additional hardware and software components that would be utilized in the illustrative computerized network environment to carry out the illustrative functions of the service 102 and/or any of the individually identified components.

With continued reference to FIG. 1, the telecommunications environment 100 can include a number of telecommunications devices 112a, 112b or other computing devices 122, each associated with a user. As will be described in more detail below, a user may request an event notification from the event organizing service 102 or submit an event modification to the event organizing service 102 using a telecommunications device 112a, 112b or other computing device 122. In an illustrative embodiment, the computing devices 122 can include various hardware and/or software components, such as a browser software application or another software application, for requesting or receiving event notifications. The telecommunications devices 112a, 112b and other computing devices 122 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, VoIP telephones, cordless telephones, cellular telephones, smart phones, modems, personal digital assistants, laptop computers, gaming devices, media players, and the like. In an illustrative embodiment, the telecommunications devices 112a, 112b include a wide variety of software and hardware components for establishing communications over one or more communication networks, including cellular telecommunications network 114, a wired telecommunications network (not shown) and/or an IP-based telecommunications network (not shown). Illustrative components of a telecommunications device 112a, 112b will be described in greater detail with regard to FIG. 2. Although the present disclosure references a telecommunications device 112a, 112b, one skilled in the relevant art will appreciate that a telecommunications device may correspond to, or otherwise be referred to, as a mobile communication device, a wireless computing device, or a computing device. Accordingly, reference to a telecommunications device 112a, 112b or computing device 120 should not be interpreted as limiting to any particular functionality or operation.

In an illustrative embodiment, the telecommunications environment 100 can include a number of additional components, systems and/or subsystems for facilitating communications with the telecommunications devices 112a, 112b and/or the event organizing service 102. The additional components can include one or more switches or switching centers 116 (in GSM embodiments, Mobile Switching Centers or MSCs) for establishing communications with the telecommunications devices 112a, 112b via the telecommunications network 114, such as a cellular radio access network, an IP-based telecommunications network based on the family of IEEE 802.11 technical standards ("WiFi") or IEEE 802.16 standards ("WiMax"), a converged wireless telecommunications network such as Unlicensed Mobile Access (UMA) or General Access Network (GAN), and other wired and wireless networks. The operation of telecommunications networks, such as telecommunications network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the telecommunications network 114 is illustrated as a single communication network, one skilled in the relevant art will appreciate that the communication network can be made up of any number of public or private communication networks and/or network connections.

As noted above, the telecommunications environment 100 can further include one or more network data sources 120 for providing external information to the event organizing service 102. The network data sources 120 may include a number of computing devices for obtaining and processing requests for information from either the event organizing service 102 and/or the telecommunications devices 112a, 112b.

Figure 2:
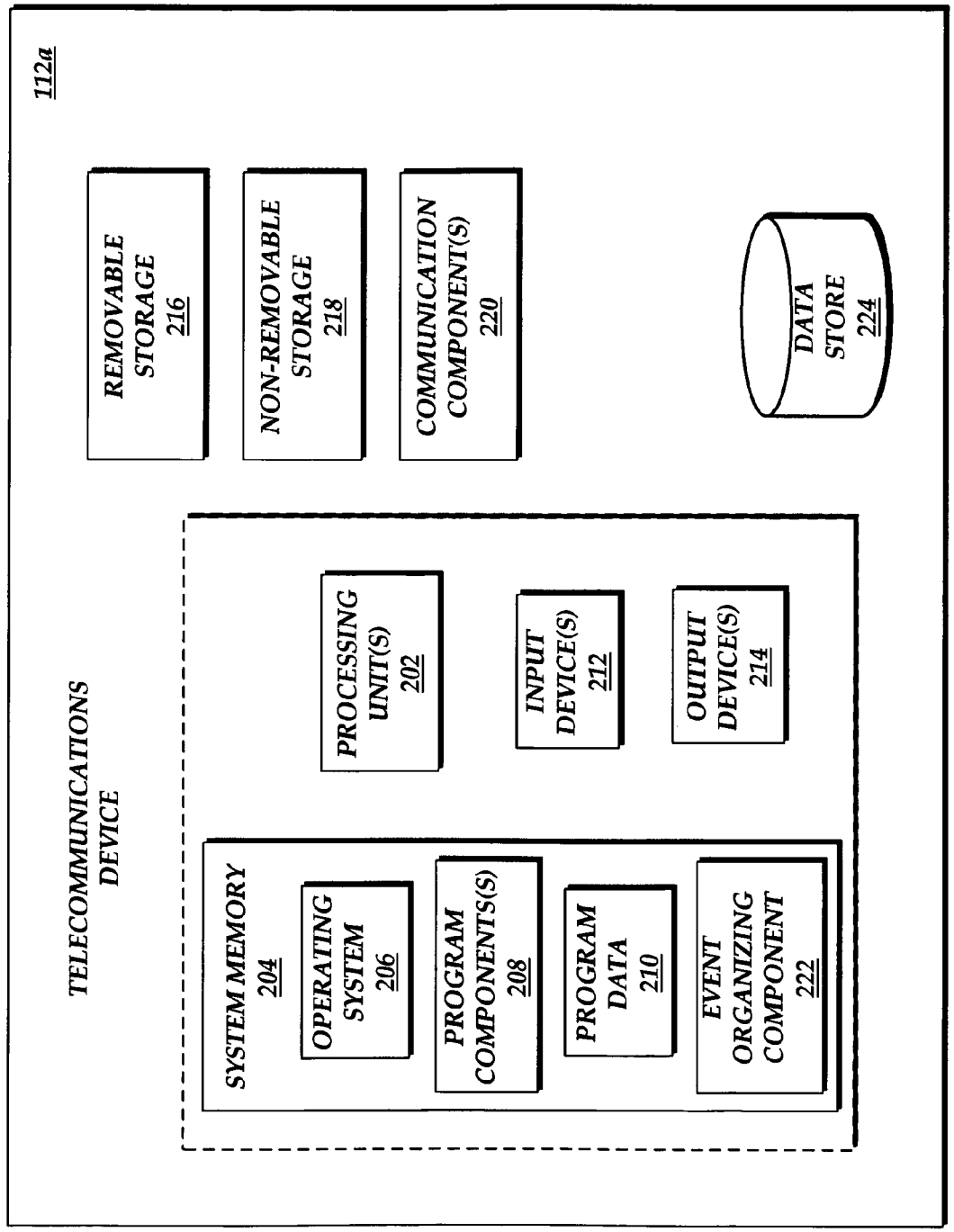
FIG. 2 is a block diagram illustrative of components of a telecommunications device for use in requesting notification of the event of interest and/or receiving notification of the event of interest.

With reference now to FIG. 2, illustrative components of a telecommunications device, such as telecommunications device 112a, for use in requesting a notification for an event of interest or submitting a modification to the event of interest will be described. The telecommunications device 112a may include one or more processing units 202, such as one or more CPUs. The telecommunications device 112a may also include system memory 204, which may correspond to any combination of volatile and/or non-volatile storage mechanisms. The system memory 204 may store information which provides an operating system component 206, various program components 208, program data 210, an event organizing component 222 and/or other components. As will be explained in greater detail below, the event organizing component 222 stored in system memory of the telecommunications device 112a may perform all or some of the functions described above in connection with the event organizing component 108 of the event organizing service 102. The above-enumerated list of components is representative and is not exhaustive of the types of functions performed, or components implemented, by the telecommunications device 112a. One skilled in the relevant art will appreciate that additional or alternative components may also be included in the telecommunications device 112a to carry out other intended functions such as a mobile telephone functions.

The telecommunications device 112a performs functions by using the processing unit(s) 202 to execute instructions provided by the system memory 204. The telecommunications device 112a may also include one or more input devices 212 (keyboard, mouse device, specialized selection keys, etc.) and one or more output devices 214 (displays, printers, audio output mechanisms, etc.). Illustrative user interfaces for a telecommunications device 112a will be described with regard to FIGS. 5, 6 and 9-11, described below.

With continued reference to FIG. 2, the telecommunications device 112a may also include one or more types of removable storage 216 and one or more types of non-removable storage 218. Still further, the telecommunications device 112a can include communication components 220 for facilitating communication via wired and wireless communication networks, such as the telecommunications network 114 and network 118 (FIG. 1). Examples of various communication protocols include, but are not limited to, Bluetooth, the family of IEEE 802.11 technical standards ("WiFi"), the IEEE 802.16 standards ("WiMax), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA and similar technologies).

Figure 3:
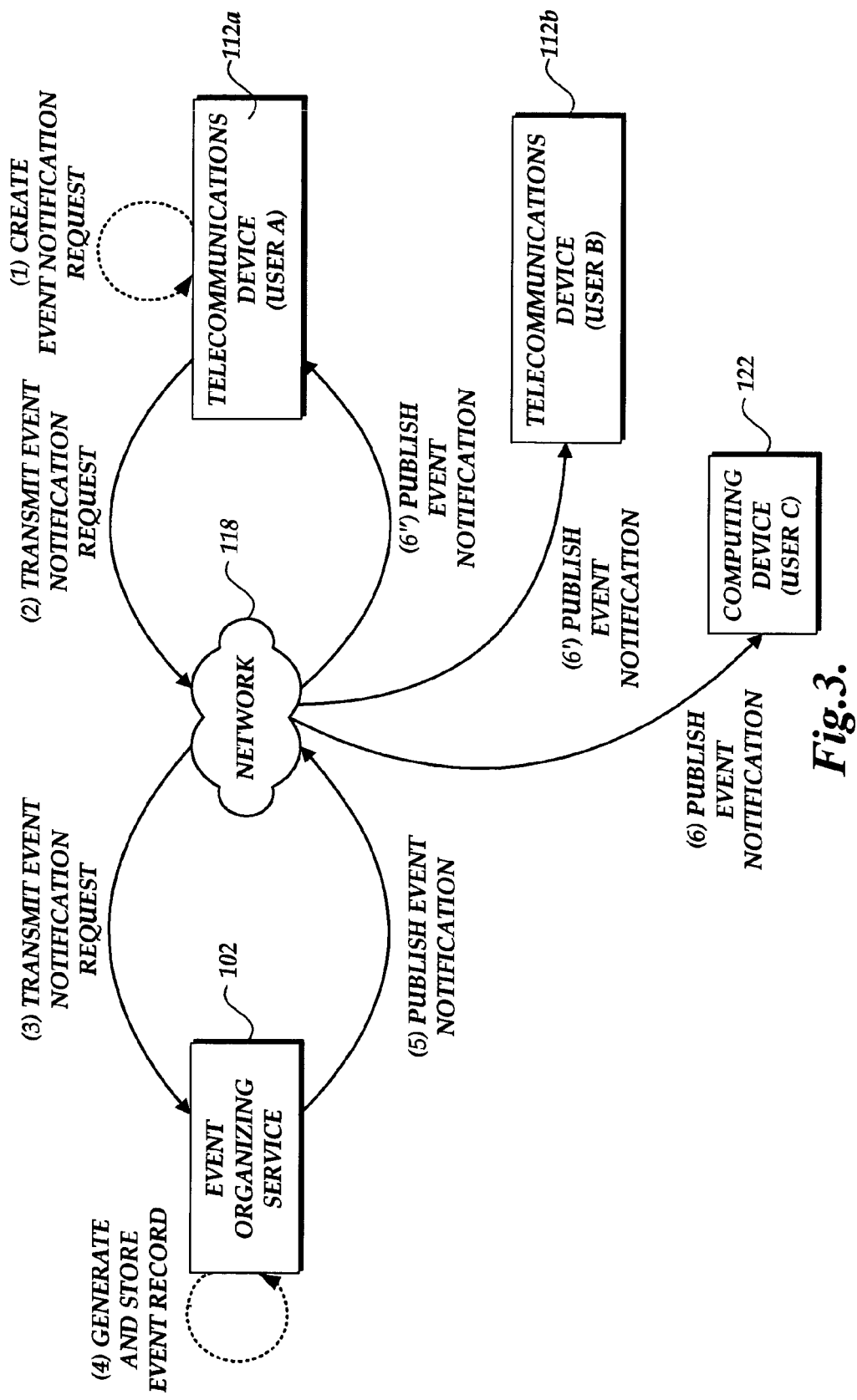
FIG. 3 is a block diagram of the telecommunications environment of FIG. 1 depicting an illustrative embodiment for notifying a user's contacts of an event of interest to the user.

FIG. 3 is a block diagram of the interaction between various components of the telecommunications environment 100 when user A of telecommunications device 112a requests to publish a notification to his or her contacts of an event of interest to user A. For purposes of the example, however, the illustration has been simplified such that many of the components utilized to facilitate communications are not shown (e.g., telecommunications network 114, switching centers 116, etc.). One skilled in the relevant art will appreciate that such components can be utilized and that additional interactions would accordingly occur without departing from the spirit and scope of the present disclosure.

As depicted in FIG. 3, user A creates an event notification request using her telecommunications device 112a for an event of interest to user A. For example, user A may be interested in having lunch with her friends at a local restaurant, and thus, creates an event notification request in order to notify her friends of the lunch event. As will be described in more detail below, the event notification request created by user A may include data that describes the event, e.g., an event descriptor, date/time, location, message, etc. Such data may be entered directly by user A utilizing the telecommunications device 112a and/or obtained by the event organizing component 222 of the telecommunications device 112a. In some embodiments, user A will also directly enter his or her contacts to whom the requested event notification is to be published. However, in other embodiments the event organizing component 222 of the telecommunications device 112a and/or the event organizing component 108 of the event organizing service 102 automatically identifies the contacts to whom the requested event notification is to be published, as will be described in more detail below. Accordingly, user A need not spend additional time or effort directly entering his or her contacts or adding contacts from an address book or other contact manager component.

The telecommunications device 112a transmits the event notification request to the event organizing service 102 via the network 118. The event organizing service 102 then generates an event record including the data describing the event and stores the event record in the event record data store 110. As noted above, the event organizing service 102 may automatically identify the contacts to whom the requested notification is to be published. In such cases, the event organizing service 102 includes the contact information (e.g., name, electronic mail address, mobile telephone number, etc.) for the automatically identified contacts (or perhaps pointers to such contact information) in the stored event record. In some embodiments, the event organizing service 102 obtains location and other supplemental data and includes such data in the event record as well. For example, the event organizing service 102 may obtain location data for the event (e.g., a street address and map for the event), location data for user A (e.g., GPS data for the telecommunications device 112a associated with user A), or location data for one or more of user A's identified contacts (e.g., GPS data for the telecommunications device 112b associated with user B, an IP address for a computing device 122 associated with user C, etc.). Other supplemental data may include, but not be limited to, an image of the event location; a map of the event location;

reviews for the event or event location; recommendations for related events, services, products, activities, and other locations; etc.

Once the event record is generated, the event organizing service 102 may publish a notification for the event of interest to user A's contacts. In one embodiment, user A's contacts are automatically identified as noted above. Accordingly, in the illustrated example, the event notification is published by the event organizing service 102 to telecommunications device 112b associated with user B and computing device 122 associated with user C. Although reference is made herein to a telecommunications or other computing device associated with a user, those skilled in the art will recognize the device is any device utilized by the user to send and receive communication using an electronic mail account, mobile telephone account by virtue of a mobile telephone number, email address, etc. Accordingly, the device need not be a dedicated device or the same device.

The event notification may be sent via the network 118 as an electronic mail message, a SMS or MMS message, an electronic message that is published or posted for viewing by others (sometimes known as a "micro-blog" post, "twitter" message or "tweet"), a user interface generated on the display of the computing device 122/telecommunications device 112 (e.g., via a pop-up window, web page, tool bar message, etc.), a voice message, etc. In some embodiments, the type of notification published depends on the contact information stored in the event record for the automatically identified contacts. In other embodiments, the originating user (e.g., user A in the illustrated example) indicates the type of notification to be published to certain contacts and/or mode of communication in the event notification request. For example, in the case of user B's telecommunications device 112b, a notification is published to the telecommunications device 112b in the form of a SMS message since the contact information for user B included a mobile telephone number. In another example, the contact information for user B may also include an email address for user B. Accordingly, the notification may be published to an email account associated user B's email address and accessed by user B via the telecommunications device 112b or another telecommunications or computing device associated with user B. In some embodiments, the notification itself includes the data describing the event. However, in other embodiments the notification (e.g., the SMS message or electronic mail message), includes a Uniform Resource Identifier (URI) (or a shortened alias for redirection of a long URI) that identifies a network resource (e.g., a web page) that can be accessed to obtain the data describing the event. Accordingly, the contact to whom the notification has been published may utilize the URI to retrieve and view the event data using his or her telecommunications or other computing device and initiate generation of the event user interface on his or her telecommunication or other computing device for displaying such information. Those skilled in the art will recognize that the event user interface may be generated for display (directly or indirectly) by the event coordination service 102 and/or the event coordination component 222 of the telecommunications or other computing device.

Figure 4:
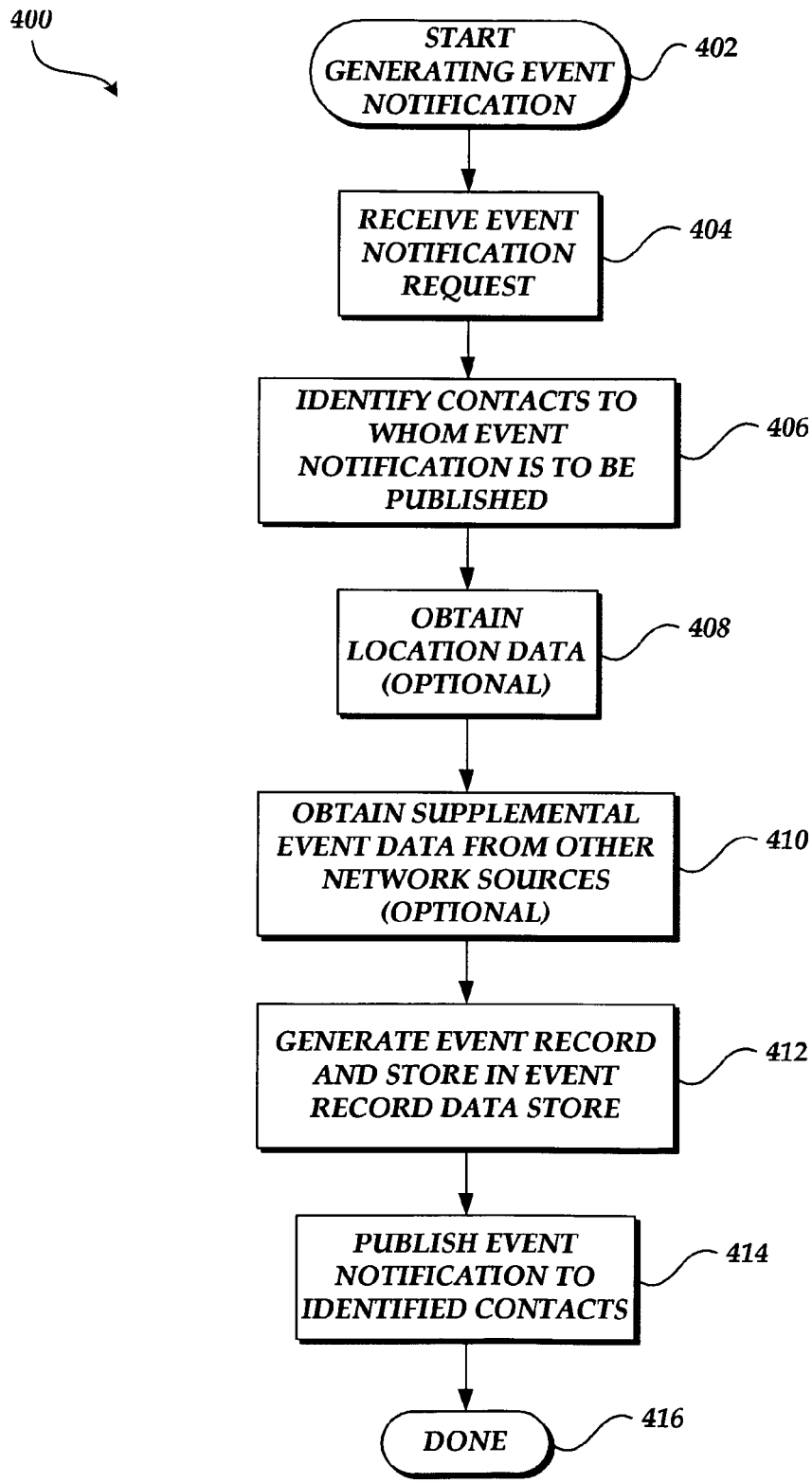
FIG. 4 is a flow diagram of an illustrative method of generating an event notification for publication to the user's contacts.

FIG. 4 is a flow diagram of an illustrative method 400 implemented by the event organizing service 102 to generate an event notification upon receipt of a request from a user. The routine begins in block 402 and proceeds to block 404 where the event organizing service 102 receives an event notification request from a user. As described in more detail below the request may include, but not be limited to, an event descriptor, date/time, location, message, etc. as supplied by the user via a user interface (such as user interface 500 shown in FIG. 5) that is generated on the display of the user's telecommunications or other computing device. Next, in block 406, the event organizing service 102 identifies contacts of the user to whom the requested event notification is to be published. In one embodiment, all or some of the contacts are included by the user in the request itself. In other embodiments, the contacts are automatically identified by the event organizing service 102 without requiring entry by, or direction from, the user. For example, the event organizing service 102 may identify and obtain contact information for a user's contacts from an address book or other contact manager component maintained on the user's telecommunications or other computing device, maintained by the event organizing service 102 or maintained by or at another network data source 120, such as a telecommunications service, a social network service or a message publication service. In addition, the contacts automatically identified by the event organizing service 102 may include only a subset of the user's contacts. A subset of contacts may correspond to a portion of the user's contacts which are accessible via the user's telecommunications or other computing device. In one illustrative embodiment, the subset of contacts is selected by the user and an indication of such can be subsequently maintained, for example, in data store 224 of the user's telecommunications device or by the event organizing service 102, for future automatic identification of the contacts to whom an event notification is to be published on behalf of the user.

In another embodiment, a portion of the subset of contacts can be selected by the user of a telecommunications or other computing device, while a remaining portion of the subset of contacts are selected automatically based on one or more other factors. In one example, the factor can be a frequency of communication between user A and one or more user contacts accessible by the telecommunications device 112a. In this example, the event organizing component 222 (or another component of the telecommunications device 112a, such a contact management component (not shown)) monitors communications between the user and each of user A's contacts accessible by the telecommunications device 112a and maintains data associated with the monitored communications. Based on the monitored communications and corresponding maintained data, a frequency of communication may be determined between user A and each of user A's contacts. This information can then be used to determine the remaining portion of the subset of contacts. In one illustrative embodiment, the remaining portion of the subset of contacts can be selected based on the contacts that have been in communication with user A the most number of times. In other embodiments, the types of communications may be monitored between the user and the user's contacts, such as SMS messages, MMS messages, emails, instant messages, voice calls, and the like, and then the remaining portion of the subset of contacts may be selected based on the frequency of one type of communication or an aggregation of some or all types of communications. In addition, if aggregated, one type of communication can be weighted over other types. Even further, in other embodiments, only those communications initiated by the user may be monitored to select the remaining portion of the subset of contacts based on the user's frequency of initiating communication with each of the user's contacts.

Additionally or alternatively, in a further embodiment, a subset of user contacts can be associated with a special rate plan offered by a telecommunications carrier providing communication services to the telecommunications device 112a. Specifically, user A may be provided a special rate associated with any communications made between user A and any of the contacts identified in the subset. In addition to a special rate, the rate plan may have a variety of other parameters that may affect selection of the contacts to be included in the subset. For example, in one embodiment, the subset of contacts may be limited in number to correspond to a number of contacts with whom communications will be provided at a special rate. As another example, the subset of contacts may be editable only after a specified period of time has elapsed from initial selection (whether by the user or partially by automated selection based on other factors such as frequency of communication information).

Accordingly, when the user submits an event notification request to the event organizing service 102, the event organizing service may automatically identify a subset of contacts to whom the event notification is to be published without requiring the user herself to identify the subset to whom the event notification is to be published. In some embodiments, the automatically identified subset of contacts will be presented to the user for confirmation and/or editing. However, in other embodiments, it will be assumed that no such confirmation is necessary since the automatically identified subset of contacts may be relied upon as the most likely contacts with whom the user would wish to organize an event or as the most likely contacts to be interested in the event.

Referring again to FIG. 4, once the contacts are identified in block 406, the event organizing service 102 may obtain location data for inclusion in the event record in block 408. The location data may be for the event itself (e.g., street address, map, etc.), the originating user (e.g., GPS coordinates for the user obtained from a GPS component included in the user's telecommunications device or obtained using a location based service), or one or more of the user's identified contacts (e.g., GPS coordinates, IP address, etc. of the telecommunications or other computing devices associated with the contacts). As will be described in more detail below, such location data may be used to augment the event notifications published by the event organizing service 102. Accordingly, the user is not required to include all or portion of such data in the request for event notification nor in an event modification.

In other embodiments, location data may be applied as a filter to the automatically identified contacts so as to select only those contacts to whom the event may be of possible interest. For example, by applying the location data as a filter, the event organizing service 102 may publish an event notification to only those identified contacts currently within or predicted to be within a certain distance or estimated arrival time of the event. In other embodiments, rather than filter the identified contacts by location to obtain a further subset to whom to publish the notification, the event organizing service 102 may include the location data for the user's contacts in the event record for further access by the user. Accordingly, the user may access and view the data (e.g., via a user interface displayed on the user's telecommunications or other computing device) to determine where her contacts are located and thus, gauge whether and/or when her contacts will attend the event.

Next, in block 410, the event organizing service 102 may obtain other supplemental data for the event from other sources, such as network data sources 120 for inclusion in the event record. Such supplemental data may include, but not be limited to, an image of the event location; a map to the event location; reviews for the event or event location; recommendations for related events, services, products, activities, and other locations; weather data related to the event; etc. In some embodiments, the user may indicate in the event notification request that she is interested in such supplemental data (e.g., by checking a box for including a map or recommendations, by indicating such in a set of user preferences maintained in the data store 224 of the user's telecommunications device or by the event organizing service 102, etc.).

In block 412, the event organizing service 102 generates an event record corresponding to the request for event notification that includes, for example, an event descriptor, date/time, location, message, etc. as supplied by the user, as well as the contact information, location data and other supplemental data obtained in blocks 406, 408 and 410. The event organizing service 102 stores then stores the event record in the event record data store 110.

Once the event record is generated, the event organizing service 102 publishes a notification of the event described in the event record to the user's identified contacts in block 414. As noted above, such a notification may be published as an electronic mail message, a SMS or MMS message, an electronic message that is published or posted for viewing by others, a user interface display, etc. In some embodiments, the type of notification published depends on the contact information stored in the event record for the automatically identified contacts or on a mode of communication preference. As also noted above, the notification (e.g., the SMS message or electronic mail message) may include a URI that identifies a network resource (e.g., a web page) that can be accessed to obtain the data from the event record that describes the event. Accordingly, the contact to whom the notification has been published may utilize the URI to retrieve and view the event data via a user interface generated on his or her telecommunications or other computing device such as the user interfaces depicted in FIGS. 6 and 9-11. Upon publication of the event notification, the method 400 ends in block 416.

Figure 5:
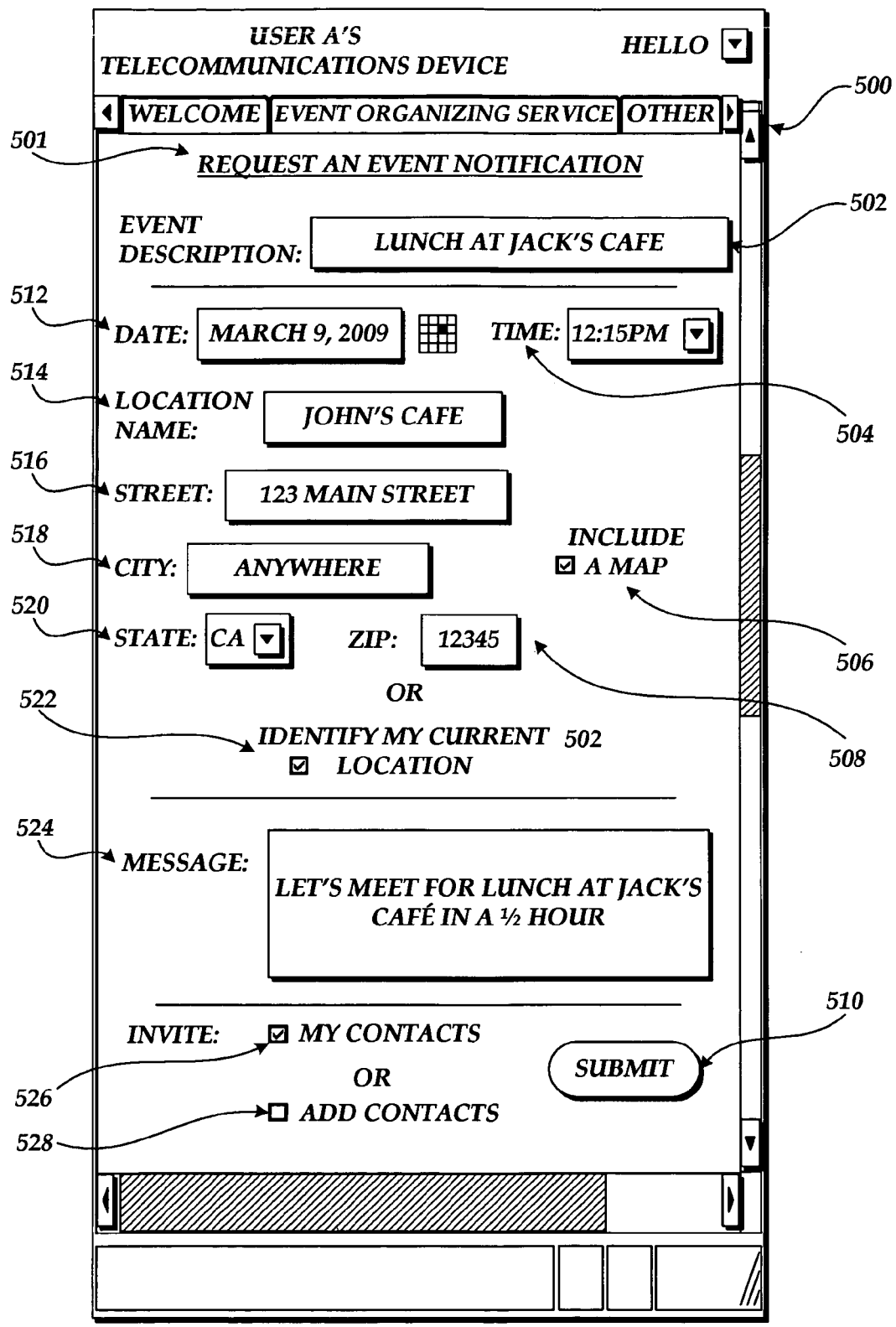
FIG. 5 is an illustrative user interface generated on a telecommunications device for enabling a user to request an event notification.

FIG. 5 is an illustrative user interface 500 generated on a telecommunications device, such as user A's telecommunications device 112a, for enabling a user to request an event notification. For example, user A may be interested in having lunch with her friends at a local restaurant. Thus, user A creates an event notification request 501 in order to notify her friends of the lunch event via user interface 500 generated by the event organizing service 102 and displayed on user A's telecommunications device (e.g., a mobile telephone). Accordingly, user A enters a descriptor 502 for the event (e.g., "Lunch at Jack's Café") and a date 512 and time 504 for the event. In other embodiments the date/time fields may be automatically completed with the current date/time, which may indicate that the event is occurring immediately.

In addition, user A may enter location data for the event, such as a location name 514, street 516, city 518, state 520 and zip code 508. The user may also include a map for the location by selecting a map checkbox 506. Alternatively, the user may indicate that her current location is the location for the event by selecting a location checkbox 522. As noted above, the event organizing service 102 may obtain current location data for the user A utilizing GPS, a location based service, etc. In addition, if the user has included a location name 514 for the event, but not a street address, the event organizing service 102 may obtain location data for the event, e.g., from a network yellow/white pages data source 120, from a combination of the same with the user's identified location, from prior event records associated with the user, etc.

User A may further enter a message 524 (e.g., "Let's meet for lunch at Jack's Café in a ½ hour") for the event notification request, which message may be included in the event notification published to user A's identified contacts. User A's contacts may be added directly by the user upon selection of an add contacts checkbox 528 (which in turn, may cause further user interfaces to be generated and displayed on the telecommunications device 112a for entry of the contacts or transfer of the contacts from an address book or other contact manager component). Alternatively, user A may select a "my contacts" checkbox 526 to indicate that the event organizing service 102 automatically identify the user's contacts and publish the event notification the user's contacts. When user A has completed the event notification request 501, user A may submit the request to the event organizing service 102 upon selection of a submit control 510.

As described above, upon receipt of the event notification request, the event organizing service 102 identifies user A's contacts and generates an event record including data describing the event. The data may include the descriptor, date/time, location, message and contact information entered by user A, as well as any contact information, location data or other supplemental data the event organizing service 102 obtains. The event organizing service 102 then publishes an event notification to user A's identified contacts. As mentioned above, the event notification may include a URI that may be utilized to retrieve and view the event record data via a user interface such as user interface 600 depicted in FIG. 6.

Figure 6:
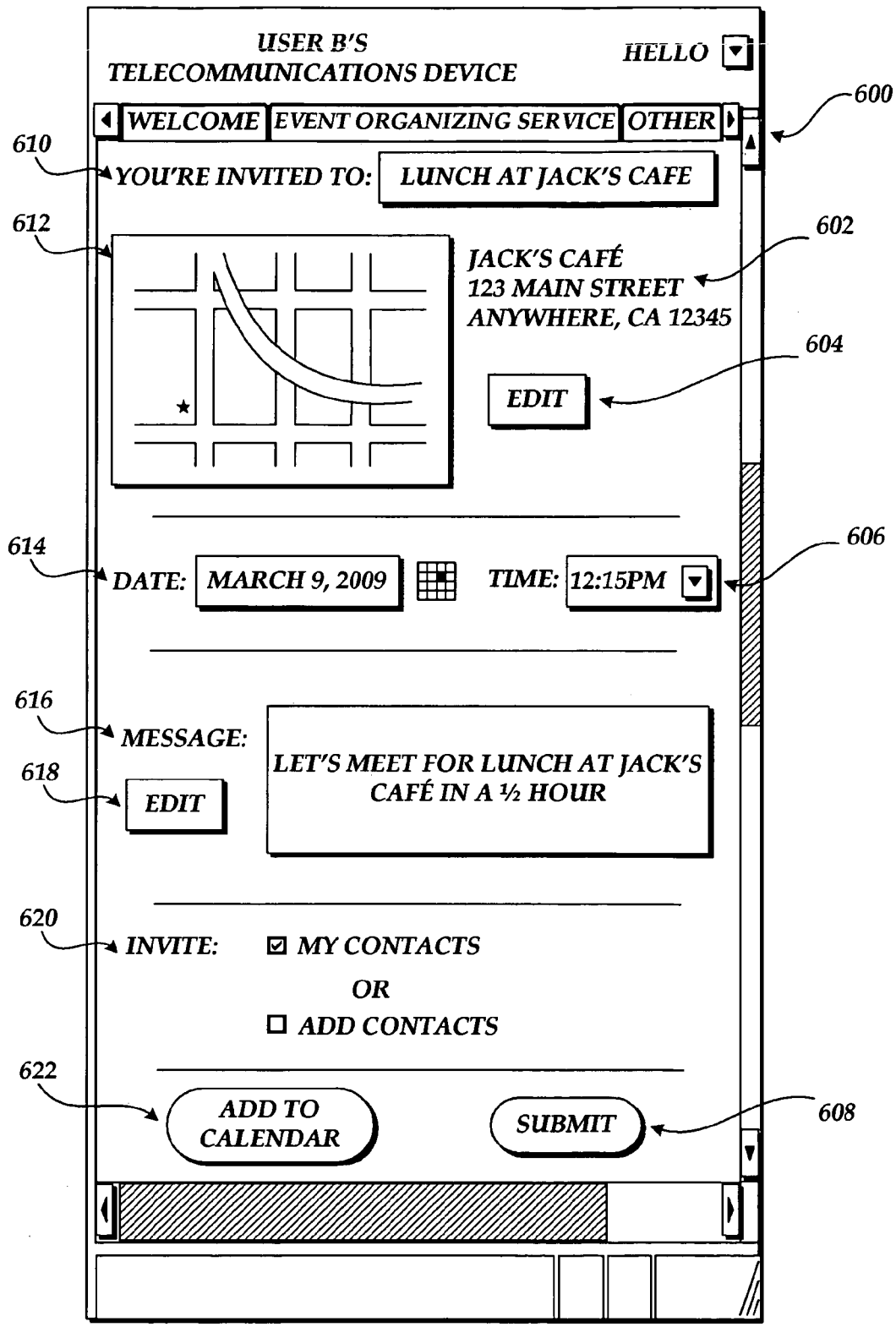
FIG. 6 is an illustrative user interface generated on a telecommunications device for displaying data describing the event of interest and enabling a contact who has received the event notification to update the event without the permission of the originating user.

As shown in FIG. 6, user B has received a published event notification for "Lunch at Jack's Café." Accordingly, user interface 600 includes the data found in the corresponding event record, such as a descriptor 610 for the event (i.e., "Lunch at Jack's Café"), location data 602, a map 612, a date 614, a time 606 and a message 616. User B may forward the event notification "as is" to his own contacts (see reference number 620) and/or add it to his calendar by selecting an add to calendar control 622. However, user B may instead choose to modify the event data. Since user A does not keep organizer rights to the event, user B (as well as user A's other identified contacts) may modify the event data stored in the corresponding event record without user A's permission or authorization. Accordingly, in one embodiment, user B may modify the event (e.g., change the date/time, change the location, etc.) and the event organizing service may publish a notification for the updated event to user A and user A's other identified contacts informing them of the modification. It will be appreciated that as updates to the event are made by user A's contacts (and in some cases user A herself), the event is ultimately organized by user A's social network or community without requiring user A to organize the details of or manage the event herself.

In the illustrated example, user B may select an edit control 604 to modify the descriptor 610 or location data 602 for the event, and an edit control 618 to modify the message 616. In addition, user B may modify the date 614 and time 606 of the event. Upon completion of the modification, user B may submit the event modifications to the event organizing service 102 upon selection of a submit control 608. Those skilled in the art will appreciate that user interface 600 may include, and the user may modify, other or different data than that depicted in FIG. 6 without departing from the spirit and scope of the present disclosure. However, those skilled in the art will appreciate from the foregoing description that user B need not obtain permission from user A to directly modify any data, particularly the descriptor, date/time and location data; nor must user B propose such a modification to user A for user A's acceptance before such modifications are made. Rather, upon receipt of the event modification from user B, the event organizing service 102 updates the corresponding event record with the modification and publishes an updated event notification to user A and the other identified contacts as will be described in more detail below.

Figure 7:
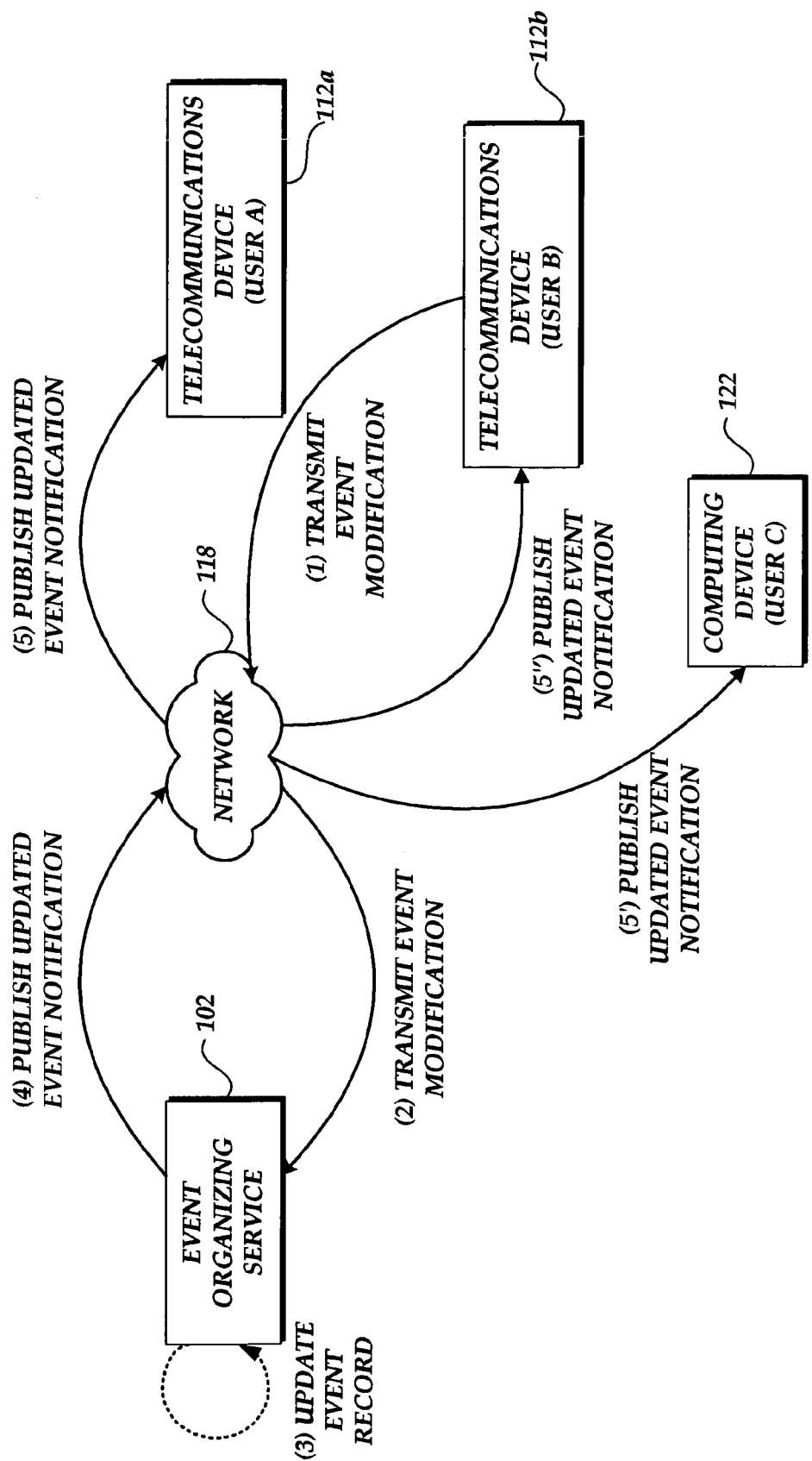
FIG. 7 is a block diagram of the telecommunications environment of FIG. 1 depicting an illustrative embodiment for notifying the originating user and other contacts of the updated event.

FIG. 7 is a block diagram of the interaction between various components of the telecommunications environment 100 when user B of telecommunications device 112b submits an event modification to the event organizing service 102. As depicted in FIG. 7, when user B submits an event modification, it is transmitted to the event organizing service 102 via the network 118. The event organizing service 102 then updates the corresponding event record to include the data modified by user B and stores the updated event record in the event record data store 110. Because the event record has been updated, the event organizing service 102 publishes an updated event notification. Accordingly, the event organizing service 102 may identify the contacts to whom the updated event notification is to be published. In some embodiments, the event organizing service 102 simply identifies the same contacts as those to whom the prior event notification was published (i.e., user A's contacts in the illustrated example), which contacts are already identified in the event record. However, in other embodiments, user B's contacts (which may be different than user A's) are also identified by the event organizing service 102 and published the updated event notification. In such cases, the event organizing service 102 adds the contact information (e.g., name, electronic mail address, mobile telephone number, etc.) for user B's identified contacts (or perhaps pointers to such contact information) in the updated event record. In some embodiments, the event organizing service 102 obtains further location and supplemental data and includes such data in the updated event record as well. For example, the event organizing service 102 may obtain new location data for the event if user B modifies the location, or updated location data for the contacts to whom the updated event notification is to be published.

Once the event record is updated, the event organizing service 102 may publish an updated notification for the event to contacts identified in the updated even record (which contacts may include the originating user (user A), user A's contacts and any additional contacts of user B. Accordingly, in the illustrated example, the updated event notification is published by the event organizing service 102 to telecommunications device 112a associated with user A and computing device 122 associated with user C. Such a notification may be sent via the network 118 as an electronic mail message, a SMS or MMS message, etc.

Figure 8:
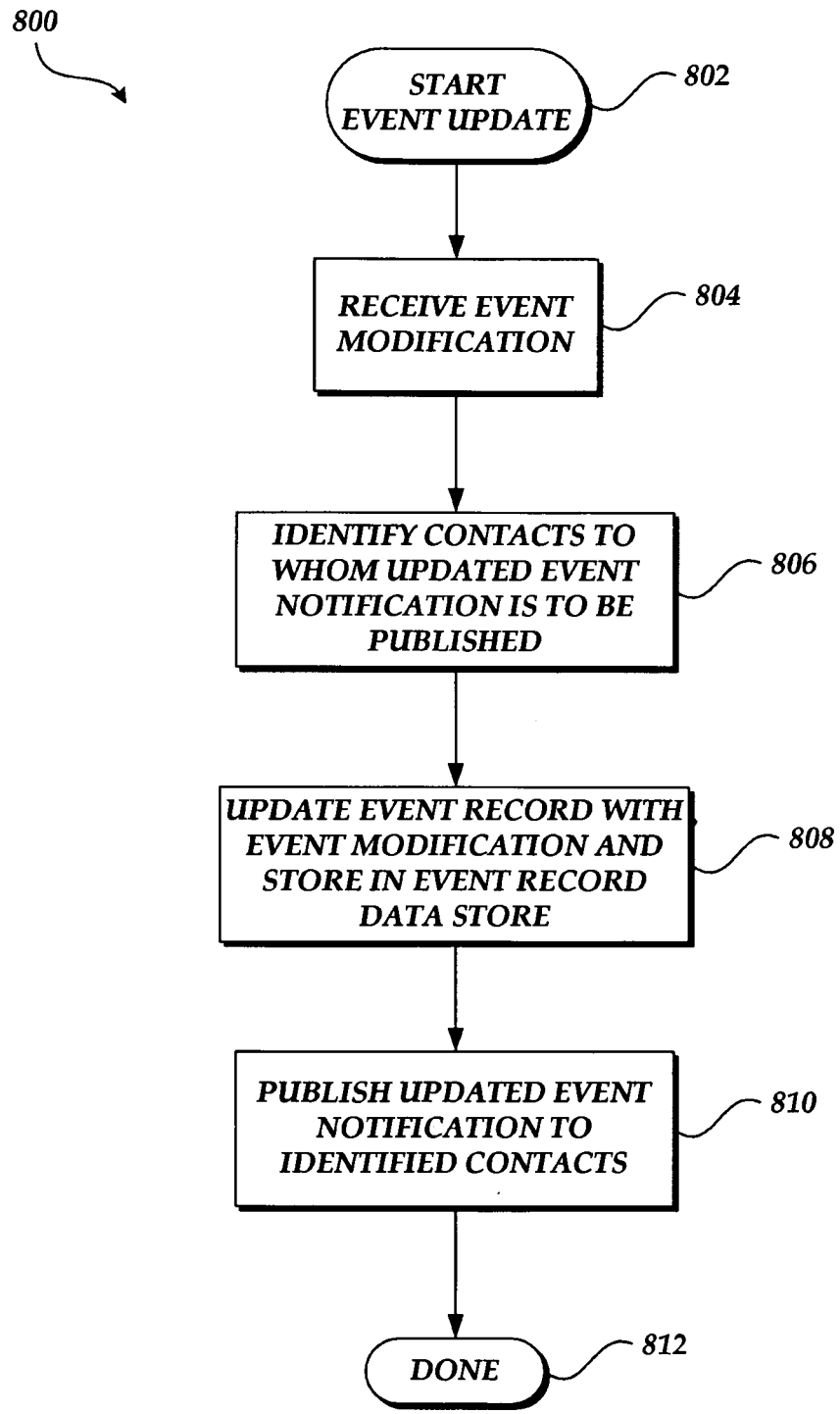
FIG. 8 is a flow diagram of an illustrative method for generating an updated event notification for publication to the originating user and other contacts.

FIG. 8 is a flow diagram of an illustrative method 800 implemented by the event organizing service 102 to update an event upon receipt of an event modification. The routine begins in block 802 and proceeds to block 804 where the event organizing service 102 receives an event modification from a contact. As described in more detail below the request may include, but not be limited to, modifications to an event descriptor, date/time, location, message, etc. of an event regarding which the contact was previously notified (see FIG. 6). Next, in block 806, the event organizing service 102 identifies contacts to whom the updated event notification is to be published. In one embodiment, the contacts are automatically identified by the event organizing service 102 without requiring entry by, or direction from, the contact submitting the modification. For example, at least a portion of the contacts may be identified from the corresponding event record.

Once the contacts are identified in block 806, the event organizing service 102 may update the event record with the event modification submitted by the contact, as well as any additional contact, location or other supplemental data it may obtain. As noted above, location data may be applied as a filter to the identified contacts so as to select only those contacts to whom the event may still be of possible interest. For example, by applying the location data as a filter, the event organizing service 102 may publish an updated event notification to only those identified contacts currently within or predicted to be within a certain physical distance or estimated arrival time of the event. Accordingly, if a contact has moved beyond such a distance or arrival time, the event organizing service 102 may not publish the updated event notification to the contact.

Next, in block 810, the event organizing service 102 publishes an updated notification of the event as described in the updated event record to the identified contacts. As noted above, such a notification may be published as an electronic mail message, a SMS or MMS message, an electronic message that is published or posted for viewing by others, a user interface display, etc. As noted above, the updated event notification (e.g., the SMS message or electronic mail message) may include a URI that identifies a network resource (e.g., a web page) that can be accessed to obtain the data from the updated event record that describes the event. Accordingly, the URI may be utilized to retrieve and view the event data using his or her telecommunications or other computing device via a user interface such as user interface 900 depicted in FIG. 9.

Figure 9:
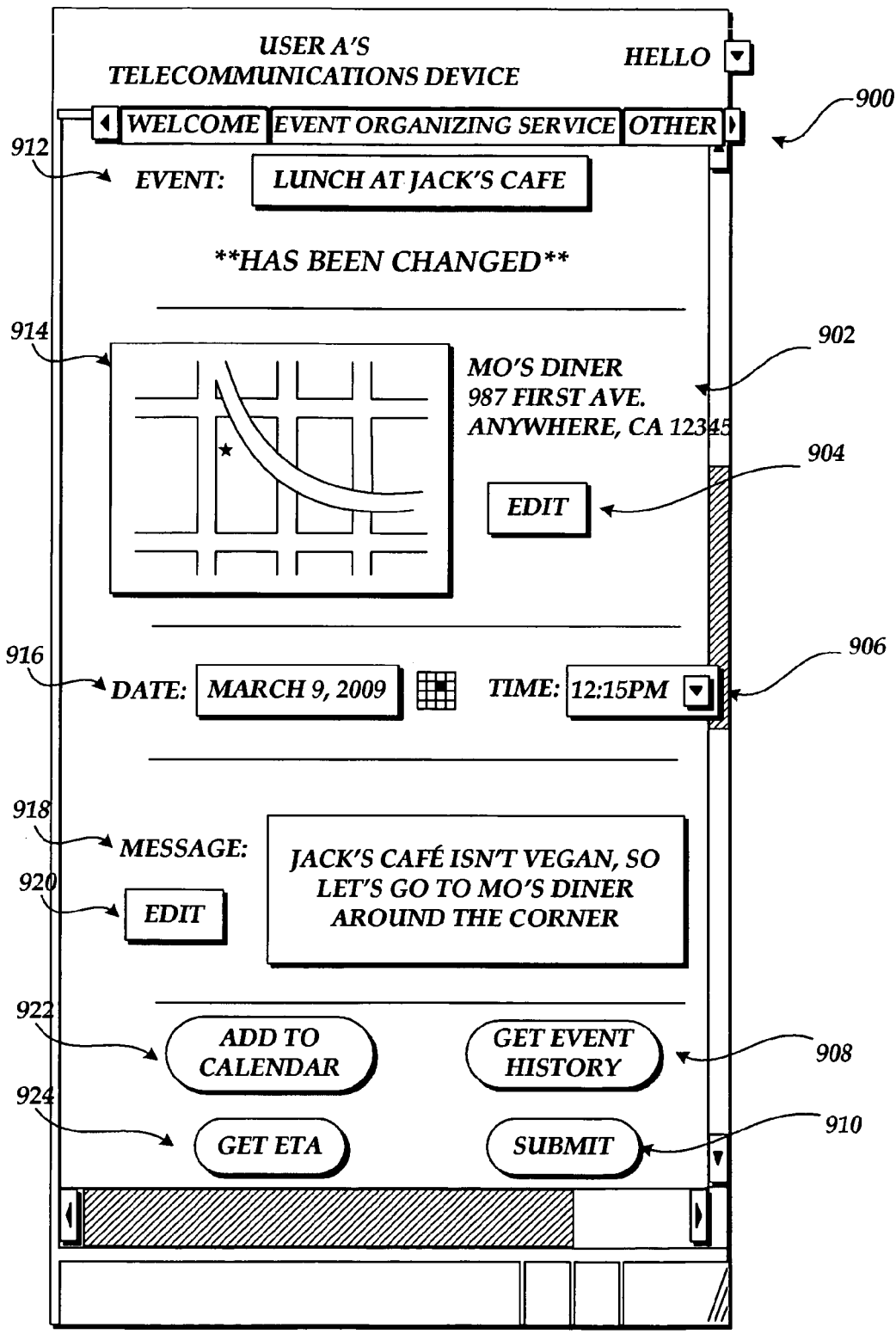
FIG. 9 is an illustrative user interface generated on a telecommnciations device for displaying data describing the updated event.
Figure 10:
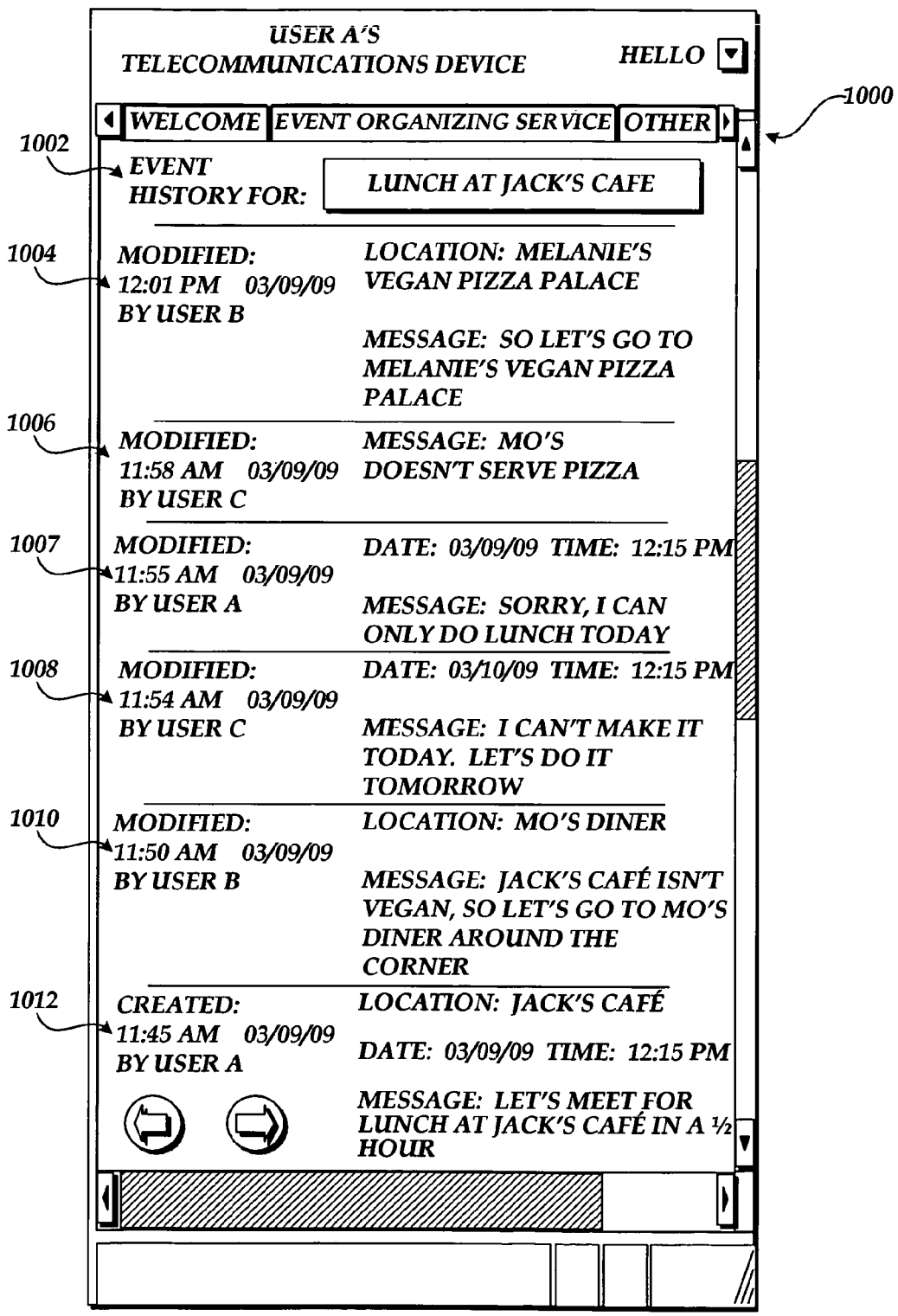
FIG. 10 is an illustrative user interface generated on a telecommunications device for displaying an event history for the event of interest that reflects the updates made to the event.

As shown in FIG. 9, user A has received an updated event notification for "Lunch at Jack's Café" indicating that the event has been changed. Accordingly, user interface 900 includes the data found in the corresponding updated event record, such as a descriptor 912 for the event (i.e., "Lunch at Jack's Café"), location data 902, a map 914, a date 916, a time 906 and a message 918. As can be seen from FIG. 9, the location data 902 and message 918 have been modified since the prior event notification. More specifically, the event location has been modified from Jack's Café at 123 Main Street, Anywhere, CA 12345 to Mo's Diner at 987 First Ave, Anywhere, CA 12345, and the corresponding message has been modified to read "Jack's Café isn't vegan, so let's go to Mo's Diner around the corner." However, the date/time of the event remain the same. In the illustrated example, user A may add the event notification to her calendar by selecting an add to calendar control 922, get a history for the event by selecting a get event history control 908 (as will be described in more detail below), get an estimated time of arrival to the event for user A and/or user A's contacts by selecting a get ETA control 924 (as will be also described in more detail below) or modify the updated event data. Since no user has organizer rights to the event, user A (as well as any other contacts who received the updated event notification) may further modify the event data stored in the corresponding event record without permission or authorization. In this manner, contacts may continue to modify the event (e.g., change the date/time, change the location, etc.) and the event organizing service 102 may continue to publish notifications to the contacts' telecommunications or other computing devices as the event is updated. In one embodiment, the modifications are made to the event record in the chronological order in which they are received by the event organizing service. However, in other embodiments, certain modifications may be given priority over others depending on the identity of the contact submitting the modification, date/time of the event, importance of the event, etc. It will be appreciated that as modifications to the event are made, the event is ultimately organized by a social network or community of contacts without requiring any particular contact to organize the details of or manage the event herself.

As noted above, user A may select a get event history control 908 to obtain a history of modifications to an event made by his or her contacts. If selected, a user interface such as user interface 1000 depicted in FIG. 10 may be generated by the event organizing service 102 and displayed on user A's telecommunications device 112a. As illustrated, user interface 1000 includes an event history 1002 for the event "Lunch at Jack's Café." Accordingly, the event history 1002 includes an entry 1012 for the original event notification, which was created at 11:45 AM on Mar. 9, 2009 by user A. The next entry 1010 in the event history (in chronological order) is for the event modification made by user B (described above) at 11:50 AM on the same date changing the location of the event "Lunch at Jack's Café" to Mo's Diner and modifying the message to read "Jack's Café isn't vegan, so let's go to Mo's Diner around the corner."

However, as can be seen from the next entry 1008 in the event history 1002, user C further modified the event at 11:54 AM to change the date of the event to Mar. 10, 2009 and indicate via the message that "I can't make it today. Let's do it tomorrow." But as evidenced by the next entry 1107, user A (who requested the original event notification), changed the date back to Mar. 9, 2009 and changed the message to read "Sorry, I can only do lunch today." As shown in the next entry 1006 to the event history 1002, user C again submits a modification to the event organizing service 102, but this time merely modifies the message to state that "Mo's doesn't serve pizza." However, user C does not change the date/time or location of the event. Rather, user B submits a modification of the event to the event organizing service 102 changing the location to Melanie's Vegan Pizza Palace and the message to "So let's go to Melanie's Vegan Pizza Palace" as is reflected in entry 1004 to the event history 1002. In the illustrated example, the modifications were made to the event record for this event in the chronological order in which they were received by the event organizing service 102. Accordingly, user A was able to change the date of the event back to Mar. 9, 2009 after user C submitted his modification changing the date to Mar. 10, 2009. However, in other embodiments, certain modifications may be given priority over others depending on the identity of the contact submitting the modification, date/time of the event, importance of the event, etc. Accordingly, in such an embodiment, if user C is identified as, for example, a key or primary contact, user C's modification is given priority and thus, user C's proposed date prevails. In yet another embodiment, a voting scheme may be implemented to resolve conflicting modifications and assign priority to the prevailing modification. Consequently, in such an embodiment, user C's modification to the date may trigger a voting option to be displayed to all of the identified contacts. Each contact is then enabled to vote for the date he or she prefers and the date with the most votes prevails. Those skilled in the art will appreciate from FIG. 10 how the event service 102 enables a group of users to publicize and organize an event dynamically, without requiring any particular contact to have organizer rights for the event or manage the event directly.

In yet another embodiment, user A (or any other contact to whom an event notification has been sent) may select a get ETA control 924 (FIG. 9) to obtain estimated arrival times for herself and/or the contacts to whom the event notification(s) were published. If selected, a user interface such as user interface 1100 depicted in FIG. 11 may be generated by the event organizing service 102 and displayed on user A's telecommunications device 112a. As illustrated, user interface 1100 includes estimated arrival times (ETAs) for the identified contacts for the event "Lunch at Jack's Café." Such ETAs may be obtained by the event organizing service 102 from a network data source 120 such as a location based service, or may be determined by the organizing service 102 from location data obtained from a network data source 120 or from the telecommunications or other computing devices associated with each of the contacts. Accordingly, the ETA 1110 for user A in the user interface 1100 is one minute, the ETA 1112 for user B is nine minutes and the ETA for user C indicates that user C is "out of range" and thus, his or her ETA cannot be determined. (This would be consistent with the event history 1002 in which user C indicated he could not make the event.) In addition to the ETAs for the contacts who have been published the event notification(s), user interface 1100 may further include a map 1106 in which a geographic position of each such contact with respect to the even is represented by an icon for the contact. Accordingly, user A (who is estimated to arrive at the event location indicated by a star shape in one minute) is represented on the map with an icon 1116, while user B is represented on the map with an icon 1104. User C who is "out of range" is represented on the map 1106 with an icon 1108 which is displayed outside of the boundaries of the map. In some embodiments, user interface 1100 is dynamically updated so that the ETA data and positions of the icons representing the contacts change in real time as the contacts near (or perhaps travel away from) the event location. Those skilled in the art will recognize that the map 1106 may be any type of map to which the event organizing service 102 may have access and that is suitable for depicting the event location. Accordingly, the map 1106 may be a street map, satellite map, a contour map, etc., displayed at any scale or level of detail appropriate for depicting the positions of the contacts relative to the event location. In addition, the scale or level of detail may change as the relative positions of the contacts change.

Figure 11:
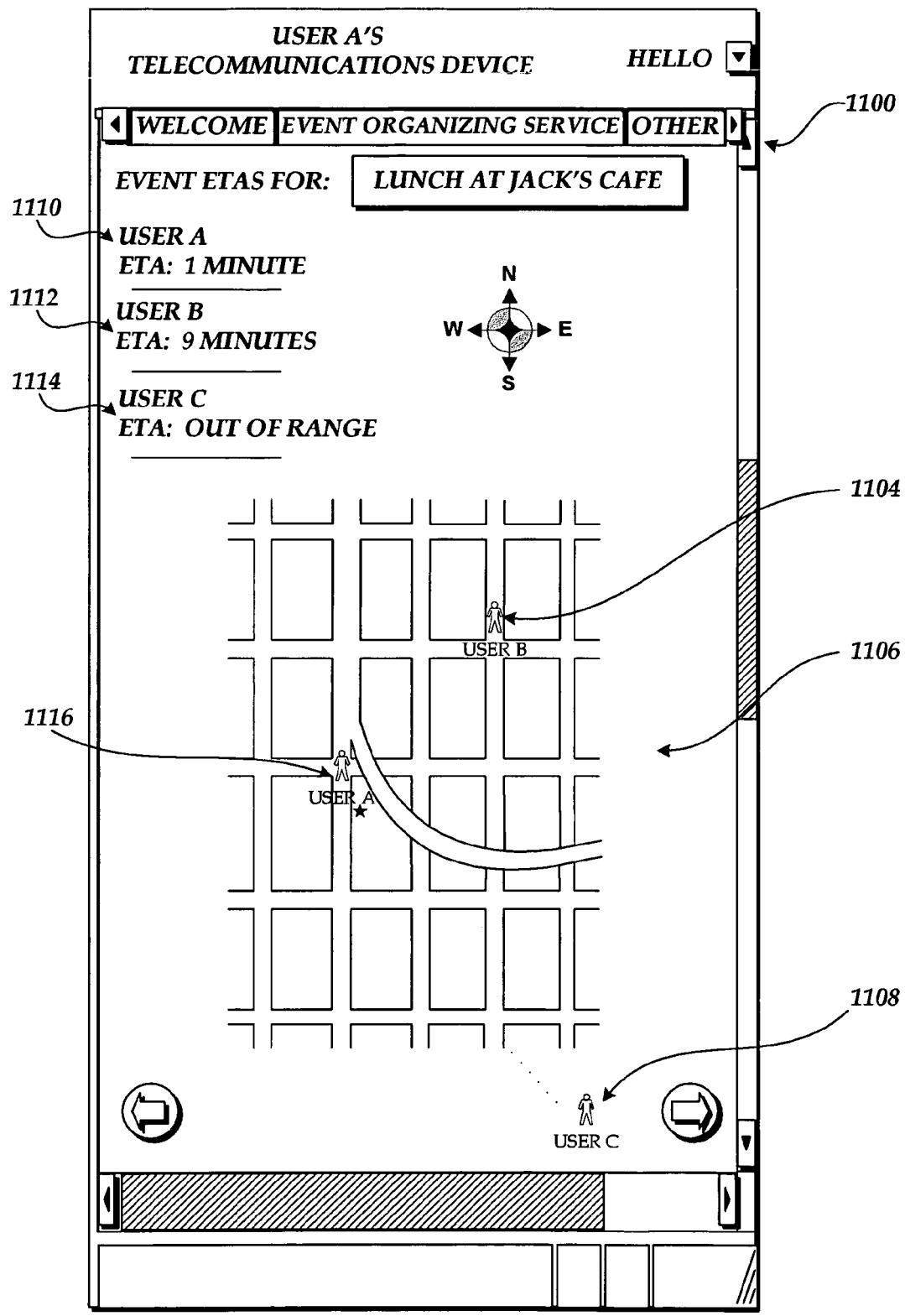
FIG. 11 is an illustrative user interface generated on a telecommunications device for displaying location and arrival data for the originating user and his or her contacts with respect to the event of interest.

Those skilled in the art will also recognize that the user interface 1100 depicted in FIG. 11, as well as the user interfaces depicted in FIGS. 5, 6 and 9-10, are illustrative and thus, may contain more, less or different data, controls, etc. than that depicted without departing from the spirit and scope of the present disclosure. In addition, the user interfaces displayed on a telecommunications device 112a, 112b may be the same as or different from those displayed on a computing device 122. For example, due to mobile phone memory constraints, bandwidth constraints, limited screen size, and/or input interfaces (e.g., touch screen, keyboard, etc.), the user interface generated on the device may vary.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for organizing events, the system comprising:
    a data store that stores event records, each event record describing an event; and
    a computing device in communication with the data store, the computing device operative to:
        obtain an event request from a mobile computing device, the event request including data describing an event of interest to a user associated with the mobile device and of possible interest to contacts of the user;
        without requiring input by the user, automatically identify contacts of the user to whom a notification of the event is to be published;
        generate an event record based on the event request obtained from the mobile computing device, the event record including the data describing the event of interest, which data is modifiable by contacts of the user who have not been granted organizer rights without permission from anyone who has been granted organizer rights;
        publish a notification of the event described in the event record to one or more contact computing devices, each contact computing device associated with an automatically identified contact of the user;
        obtain a modification to the data describing the event of interest from a computing device associated with at least one automatically identified contact who has not been granted organizer rights;
        without requiring that the modification be proposed to anyone who has been provided organizer rights for the event, update the event record with the modification to the data; and
        publish a notification of the event described in the updated event record to the mobile device associated with the user and to each of the one or more contact computing devices.

2. The system of claim 1, wherein the computing device is further operative to obtain location data for the event.

3. The system of claim 1, wherein the computing device is further operative to obtain supplemental data for the event from an external source.

4. The system of claim 1, wherein the computing device automatically identifies the contacts of the user based on at least one of a type of the event, a location of the event, time of the event, input of the user, location of the user, and location of at least one contact.

5. The system of claim 1, wherein the computing device obtains a plurality of modifications to the data describing the event of interest and updates the event record with each of the plurality of modifications in a chronological order in which the plurality of modifications are obtained.

6. The system of claim 5, wherein the plurality of modifications are obtained from the mobile device associated with the user and a contact computing device associated with at least one automatically identified contact.

7. A method for organizing an event of interest to a contact, the method comprising:
    as implemented by one or more computing devices configured with specific executable instructions, obtaining a modification to data describing the event of interest from a computing device to which a notification for the event of interest has been published;

without requiring that the modification be proposed to an organizer of the event, updating an event record including data describing the event of interest with the modification to the data, wherein the event record is updated without obtaining either permission or organizer rights from the organizer of the event;

automatically identifying contacts to be notified of the updated event record; and publishing a notification of the event described in the updated event record to a plurality of computing devices, each of the computing devices associated with an automatically identified contact.

8. The method of claim 7, wherein the event notification is published as at least one of an electronic message, a voice message or a user interface display.

9. The method of claim 8, wherein the event notification comprises at least one of a descriptor of the event, location of the event, time of the event, a message regarding the event and an estimated time of arrival to the event.

10. The method of claim 7, wherein the contacts are automatically identified from a set of contacts maintained by at least one of a telecommunications service, a social network service and a message publication service.

11. The method of claim 7, wherein a plurality of modifications to the data describing the event of interest are obtained.

12. The method of claim 11, wherein the event record is updated with each of the plurality of modifications in an order in which the plurality of modifications are obtained.

13. The method of claim 11 further comprising providing an event history for the event of interest, the event history describing the plurality of modifications with which the event record has been updated.

14. The method of claim 13, wherein the event history describes the plurality of modifications with which the event record has been updated in at least one of a chronological order in which the plurality of modifications were obtained and an order depending on a priority assigned to one or more modifications.

15. A system for organizing an event of possible interest, the system comprising:

a data store that stores event records, each event record describing an event; and a computing device in communication with the data store, the computing device operative to:

obtain modifications to data describing the event of interest from one or more computing devices to which an event notification for the event of interest has been published;

without requiring that the modifications be proposed to anyone who has been provided organizer rights for the event, update an event record including data describing the event of interest with the modifications to the data in an order in which the modifications are obtained, wherein the event record is updated without obtaining either permission or organizer rights from anyone who has been provided organizer rights for the event; and generate one or more event update notifications for publication to the one or more computing devices to which the event notification has been published as the event record is updated with the modifications, each of the computing devices associated with a contact who may be interested in the event.

16. The system of claim 15, wherein at least one of the one or more computing devices from which the modifications to data describing the event of interest are obtained is a mobile computing device.

17. The system of claim 15, wherein the event update notification is published as at least one of an electronic message, a voice message or a user interface display.

18. The system of claim 15, wherein the computing device is further operative to automatically identify one or more contacts who may be interested in the event.

19. The system of claim 18, wherein the contacts are automatically identified from a set of contacts maintained by at least one of a telecommunications service, a social network service and a message publication service.

20. The system of claim 19, wherein a conflict between obtained modifications is resolved by enabling the contacts to vote on the obtained modifications.

21. The system of claim 15, wherein the event update notification comprises at least one of a descriptor of the event, location of the event, time of the event, message regarding the event, and an estimated time of arrival to the event.

22. The system of claim 15, wherein the event record is updated with the modifications in an order in which the modifications are obtained.

23. The system of claim 15, wherein the event record is updated with the modifications in an order depending on a priority assigned to one or more modifications.

24. The system of claim 15, wherein the computing device is further operative to generate an event history for the event of interest, the event history describing the modifications with which the event record has been updated.

25. The system of claim 24, wherein the event history describes the modifications with which the event record has been updated in the chronological order in which the modifications were obtained.

26. The system of claim 24, wherein the event history describes the modifications with which the event record has been updated in a priority order assigned to the modifications.

27. A non-transitory computer-readable medium having a computer-executable component for organizing an event, the computer-executable component comprising:

an event organizing component operative to:

obtain modifications to data describing the event of interest from one or more computing devices to which an event notification for the event of interest has been published;

without requiring that the modifications be proposed to an organizer of the event, update an event record including data describing the event of interest with the modifications to the data in an order, wherein the event record is updated without obtaining organizer rights from the organizer of the event; and generate one or more event update notifications for publication to the one or more computing devices to which the event notification has been published as the event record is updated with the modifications, each of the computing devices associated with a contact who may be interested in the event.

28. The non-transitory computer-readable medium of claim 27, wherein at least one computing device from which a modification is obtained is a mobile computing device.

29. The non-transitory computer-readable medium of claim 27, wherein the event organizing component is further operative to obtain location data for at least one computing device from which a modification is obtained.

30. The non-transitory computer-readable medium of claim 29, wherein the event organizing component is further operative to update the event record based on the obtained location data.

31. The non-transitory computer-readable medium of claim 30, wherein the event organizing component is further operative to generate an estimate of a time of arrival to the event based on the location data.

32. The non-transitory computer-readable medium of claim 27, wherein the event update notification is published as at least one of an electronic message, a voice message or a user interface display.

33. The non-transitory computer-readable medium of claim 27, wherein the event update notification includes a locator to a resource from which data describing the updated event is accessed.

34. The non-transitory computer-readable medium of claim 33, wherein the data describing the updated event comprises at least one of a descriptor of the event, location of the event, time of the event, message regarding the event, and an estimated time of arrival to the event.

35. The non-transitory computer-readable medium of claim 27, wherein the event organizing component is further operative to automatically identify one or more contacts who may be interested in the event.

36. The non-transitory computer-readable medium of claim 35, wherein the contacts are automatically identified from a set of contacts maintained by at least one of a telecommunications service, a social network service and a message publication service.

37. The non-transitory computer-readable medium of claim 27, wherein the order in which the event record is updated is a chronological order in which the modifications are obtained.

38. The non-transitory computer-readable medium claim 27, wherein the order in which the event record is updated depends on a priority assigned to the modifications.

39. The non-transitory computer-readable medium of claim 27, wherein the event organizing component is further operative to generate an event history for the event of interest, the event history describing the modifications with which the event record has been updated.

40. The non-transitory computer-readable medium of claim 39, wherein the event history describes the modifications with which the event record has been updated in an order depending on at least one of the chronological order in which the modifications were obtained and a priority assigned to the modifications.

41. The non-transitory computer-readable medium of claim 27, wherein the event organizing component is further operative to enable contacts to vote on conflicting modifications.

* * * * *

UNITED STATES PATENT AND TRADEMARK OFFICE
CERTIFICATE OF CORRECTION

| | | |
|---|---|---|
| PATENT NO. | : 8,676,626 B1 | Page 1 of 1 |
| APPLICATION NO. | : 12/413459 | |
| DATED | : March 18, 2014 | |
| INVENTOR(S) | : Vance | |

It is certified that error appears in the above-identified patent and that said Letters Patent is hereby corrected as shown below:

On the Title Page
In column 2 (page 4, item 56) at line 1, Under Other Publications, change "Mar. 8, 2009," to --Apr. 8, 2009,--.

In the Specification
In column 2 at line 12, Change "communciations" to --communications--.
In column 12 at line 32, Change "even" to --event--.
In column 15 at line 5, Change "even" to --event--.

In the Claims
In column 20 at line 8, In Claim 38, change "medium claim" to --medium of claim--.

Signed and Sealed this
Twenty-third Day of September, 2014

Michelle K. Lee
*Deputy Director of the United States Patent and Trademark Office*